United States Patent [19]

Kleinstück et al.

[11] Patent Number: 5,525,257
[45] Date of Patent: Jun. 11, 1996

[54] COMPOSITION FOR WATER TREATMENT CONTAINING POLYASPARTIC ACIDORA DERIVATIVE THEREOF AND A POLCARBOXYLIC ACID AND METHODS OF USING THE COMPOSITION

[75] Inventors: Roland Kleinstück, Bergisch Gladbach; Hermann Sicius, Düsseldorf; Torsten Groth; Winfreid Joentgen, both of Köln, all of Germany

[73] Assignee: Bayer AG, Leverkusen, Germany

[21] Appl. No.: 320,004

[22] Filed: Oct. 7, 1994

[30] Foreign Application Priority Data

Jul. 12, 1994 [DE] Germany ............... 44 24 476.2

[51] Int. Cl.$^6$ .................................. C02F 5/00
[52] U.S. Cl. ................ 252/181; 252/180; 210/700
[58] Field of Search ................. 252/180, 80, 82; 210/96, 701

[56] References Cited

U.S. PATENT DOCUMENTS

| | | |
|---|---|---|
| 4,008,164 | 2/1977 | Watson et al. .......... 252/180 |
| 4,196,272 | 4/1980 | Goretta et al .......... 252/180 |
| 4,277,359 | 7/1981 | Lipinski .......... 252/181 |
| 4,431,547 | 2/1984 | Dubin .......... 252/180 |
| 4,530,766 | 7/1985 | Hann et al. .......... 252/180 |
| 4,839,461 | 6/1989 | Boehmke .......... 252/80 |
| 5,116,513 | 5/1992 | Koskan et al. .......... 252/180 |
| 5,152,902 | 10/1992 | Koskan et al. .......... 252/180 |
| 5,284,512 | 2/1994 | Koskan et al. .......... 106/416 |
| 5,373,086 | 12/1994 | Koskan .......... 528/328 |

FOREIGN PATENT DOCUMENTS

WO93/23452 11/1993 WIPO.
WO94/19288 9/1994 WIPO.

OTHER PUBLICATIONS

Orbit abstract of WO-A-9419288 (09/01/94).
Kovacs et al., Chemical Studies of Polyaspartic Acids. *J. Org. Chem.*, vol. 26, pp. 1084–1091 (Apr. 1961).

*Primary Examiner*—Stephen Kalafut
*Assistant Examiner*—James M. Silbermann
*Attorney, Agent, or Firm*—Connolly & Hutz

[57] ABSTRACT

An improved composition for water treatment and for alkaline cleaning contains polyaspartic acid or a derivative thereof and a polycarboxylic acid.

9 Claims, No Drawings

COMPOSITION FOR WATER TREATMENT CONTAINING POLYASPARTIC ACID OR A DERIVATIVE THEREOF AND A POLCARBOXYLIC ACID AND METHODS OF USING THE COMPOSITION

The invention relates to a composition for water treatment and for alkaline cleaning and to a process for water treatment using this composition and to a process for alkaline cleaning using this composition.

When natural waters are used for industrial purposes, e.g., as cooling water or in industrial cleaning methods, the water used is purposefully or unintentionally physically and/or chemically altered. Thus, e.g., in open circulation cooling systems, temperature changes, concentration and a pH increase, which is produced by the carbon dioxide discharge in the cooling tower, are unavoidable. In industrial cleaning, e.g., in the food industry, in many applications the use of alkali, usually sodium hydroxide solution, is necessary in the cleanser solutions.

Both as a result of concentration and pH increase via $CO_2$ discharge and also as a result of addition of sodium hydroxide solution, the concentration of hardness-forming salts, in particular calcium ions and carbonate ions, increases. If the natural waters were in equilibrium (lime/carbonic acid equilibrium) before use, the increase in concentration of the hardness-forming salts leads to a supersaturation. To prevent limescale deposits (encrustations, scale), e.g., on heat exchange surfaces or on the material to be cleaned, the addition of additives ("scale inhibitors") is necessary.

The situation is similar in oil production, e.g., in secondary recovery:

The injected waters used must be treated, in some cases, by additives in order to prevent precipitation of inorganic salts such as calcium carbonate and calcium sulfate, strontium sulfate and barium sulfate in the formation and an impact on the oil flow resulting therefrom.

A further, sometimes even the chief, purpose of the additive use in water treatment is the protection of metallic materials from corrosion. For example, when unalloyed carbon steels are used in open circulation cooling systems, sufficient corrosion inhibition is desired since conditions (oxygen saturation, salt enrichment) prevailing in such systems lead to an acceleration of corrosion.

The water treatment compositions and alkaline cleansers used according to the prior art are in need of further improvements, since all the components used in these compositions have disadvantages to a greater or lesser extent:

Polyphosphates have only a limited solubility, so that the preparation of highly concentrated formulations is restricted. Moreover, they are hydrolytically unstable. Furthermore, their relatively high phosphorus content is criticized.

Phosphorares of the type nitrilo-tris-methylenephosphonic acid and 1-hydroxy-ethane-1,1-diphosphonic acid are technically advanced products in comparison with polyphosphates. They show a good hydrolysis stability and good efficacy as scale inhibitors, but have a relatively high phosphorus content.

2-Phosphono-butane-1,2,4-tricarboxylic acid, in comparison with the other phosphonates, exhibits an improved scale-inhibiting action with considerably improved stability with respect to hypochlorite and hypobromite or chlorine and bromine, which are used as biocides and disinfectants. The phosphorus content of this product is considerably reduced in comparison with the other phosphonates.

Polyacrylates, copolymers based on acrylic acid and other analogous polycarboxylic acids having C—C chains have the disadvantage of a corrosion-inhibiting and scale-inhibiting action which is unsatisfactory for many applications. However, they are phosphorus-free, which can be a considerable advantage in the case of applications in which the products, after use, pass into an outfall in which problems with eutrophication due to phosphates exist.

All the organic compounds mentioned hitherto share only a slight biodegradability. This is frequently a precondition for their use, e.g., the use of easily biodegradable additives in open circulation cooling systems, because of the conditions prevailing in such systems, would lead to the degradation of the additives even in the system. In other applications, e.g., having very low residence times in the system, in contrast, an easy biodegradability will have a less interfering effect.

Art easy biodegradability is in any case advantageous when the additives pass into the outfall–which occurs frequently –after use.

Therefore, the development of easily or more easily biodegradable additives for water treatment and use in alkaline cleansers is a technically and ecologically expedient aim.

A first step for this has been made by the development of the polycarboxylic acid polyaspartic acid (PAA) susceptible to biodegradation. However, the effects of PAA as a scale- and corrosion-inhibitor are insufficient.

The present invention relates to a composition for water treatment, and for use in alkaline cleansers, containing polyaspartic acid or a derivative thereof and a polycarboxylic acid PC having C—C chains. In a preferred embodiment, the polyaspartic acid or derivative thereof and the polycarboxylic acid PC are present in a weight ratio of 10:90 to 90:10. The polyaspartic acid is preferably used as a salt, in particular as a sodium salt or potassium salt. However, it is also possible to use a derivative of polyaspartic acid, for example the anhydride of polyaspartic acid, viz polysuccinimide. This can convert into polyaspartic acid as a result of hydrolysis under suitable conditions during use. The polycarboxylic acid PC can be used as free acid or as salt, in particular as sodium salt or potassium salt. For the purposes of the present invention, polyaspartic acid and polycarboxylic acid PC are also taken to mean salts of these acids.

The preparation and use of polyaspartic acid (PAA) and derivatives thereof has been for a long time subject matter of numerous publications and patents. Thus the preparation can be carried out by thermal polycondensation of aspartic acid (J. Org. Chem. 26, 1084 (1961)).

US-A 4 839 461 (=EP-A 0 256 366) describes the preparation of polyaspartic acid from maleic anhydride, water and ammonia. Maleic anhydride is converted into the monoammonium salt in aqueous medium with addition of concentrated ammonia solution.

In a preferred embodiment, the polyaspartic acid is prepared by subjecting the reaction product of maleic anhydride or maleic acid with ammonia, e.g., maleic amide and the ammonium salt of maleic acid, to a thermal, if required continuous, polymerization at temperatures greater than 140° C., in particular greater than 180° C., and converting the resulting polysuccinimide by hydrolysis to polyaspartic acid or a salt thereof. The polyaspartic acid can also be prepared by polymerization of aspartic acid.

The polyaspartic acid essentially contains, in a preferred embodiment, repeating units of the following structure:

a)

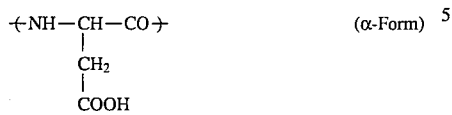 (α-Form)

and b)

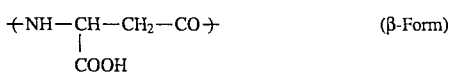 (β-Form)

The proportion of the β-form is generally more than 50%, in particular more than 70%.

In addition to the repeating polyaspartic acid units a) and b), other repeating units can also be contained therein, e.g.:

c) malic acid units of the formula

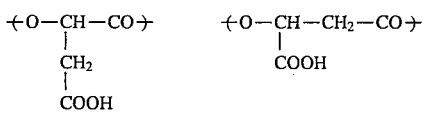

d) maleic acid units of the formula

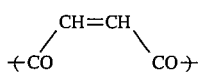

e) fumaric acid units of the formula

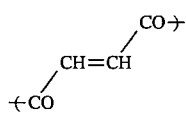

Preference is given to polymers having a molecular weight according to gel-permeation chromatographic analysis of from 500 to 10,000, preferably 1,000 to 5,000, particularly preferably 2,000 to 4,000.

Preferred polycarboxylic acids PC are compounds which are prepared by homo- or copolymerization of unsaturated monobasic or polybasic carboxylic acids and if appropriate still other additional comonomers, or the preparation of which is at least alternatively possible by this route.

Unsaturated carboxylic acids are taken to mean in this context, e.g.:

acrylic acid, methacrylic acid, maleic acid (frequently used as maleic anhydride), fumaric acid, iraconic acid.

Additional comonomers which can be incorporated by polymerization can be, e.g.:

derivatives of acrylic or methacrylic acid such as esters and amides, e.g., 2-hydroxypropyl acrylate, 2-acrylamido-2-methylpropanesulfonic acid, acrylamide, ethyl acrylate, vinyl ethers or allyl ethers, styrylsulfonic and styrylphosphonic acid, vinylphosphonic acid, olefins.

The molecular weight of the polycarboxylic acids PC can vary in a wide range.

Products having molecular weights between about 500 and 100,000 are preferred.

The compositions according to the invention can also be used in this case with one or more substances which have proved to be useful for the respective application. Examples of such further components are:

Zinc salts, molybdates, borates, silicates, azoles (e.g., tolyltriazole or benzotriazole), phosphonic acids, other polymers and copolymers based on acrylic acid, methacrylic acid or maleic acid, ligninsulfonates, tannins, phosphates, complexing agents, citric acid, tartaric acid, gluconic acid, surfactants, biocides and disinfectants. It is obvious to those skilled in the art that instead of acids (e.g., "phosphonic acids") their salts ("phosphonates") can alternatively be used and vice versa.

The compositions according to the invention can be used in many ways, for example as scale inhibitors and sequestrants and as corrosion inhibitors. Areas of application of such compositions can be, e.g.,: water treatment (e.g., treatment of cooling waters, process waters, gas scrubbing waters, injection waters in secondary oil recovery and water treatment in mining) and industrial and institutional cleaning applications (e.g., cleaning of vessels and equipment in the food industry, bottle washing, for institutional dishwashers and washing agents).

The present invention further relates to a process for water treatment, wherein the composition according to the invention is introduced into the water to be treated.

The present invention further relates to a process for alkaline cleaning, wherein the composition according to the invention is used as an encrustation inhibitor/sequestrant.

The process for water treatment is to be described below on the basis of examples:. e.g., the compositions according to the invention are added to the feed water in concentrations between about 0.1 and 10 mg/l of active compound to prevent encrustations and scale during use in cooling systems with fresh water cooling.

In the cooling circuits, the metering of the additives to prevent scale and/or corrosion is frequently rate-dependent based on the make-up water. The concentrations are between about i and 50 mg/l of active compounds in the circulating cooling water.

In sea water desalination by distillation in MSF (multistage flash) and VP (vapour compression) plants, encrustations on surfaces, especially on heat exchange surfaces, are prevented by additive additions of about 1 to 10 mg/l of active compounds to the feed sea water.

The dosages required in RO (reverse osmosis) plants are generally markedly lower because of the process-related lower maximum temperatures.

The process for using the compositions according to the invention in alkaline cleaning will be described as follows:

The active compound concentrations used in alkaline cleaning to inhibit encrustation, for sequestration and for increasing the cleaning effect depend, in particular, on the technical and physicochemical conditions, such as pHs, residence times, temperatures and especially water hardness, as well as on the degree of fouling.

Whereas active compound concentrations significantly below 100 mg/l, generally 5 to 80 mg/l, are frequently satisfactory in the weak alkaline range (pH to about 10) at temperatures below 60° C. and with relatively short residence times, at higher alkali concentrations and temperatures rates of over 100 mg/l to 500 mg/l are occasionally required.

In the following examples which are intended to describe the invention, a polyaspartic acid (PAA) having a molecular weight of approximately 3,000 is used (as sodium salt). The β proportion was approximately 70 %.

Examples 1 and 2 show that under conditions such as occur, e.g., in the alkaline cleaning of vessels in the food industry, by a combination of polycarboxylic acids PC and PAA mixtures are obtainable having synergistic hardness-stabilizing action.

From Example 3, a surprising synergistic, corrosion-inhibiting activity of such mixtures can be recognized.

EXAMPLE 1

Determination of the threshold effect (inhibition of the crystallization of calcium carbonate from supersaturated, aqueous solutions by substoichiometric concentrations of inhibitors) in a comparative experiment 1. Parameters of the synthetic tap water used

| Water parameter | | |
|---|---|---|
| Ion Concentration (mg/l) | $Ca^{2+}$ | 100 |
| | $Mg^{2+}$ | 12 |
| | $Na^+$ | 145 |
| | $HCO_3^-$ | 195 |
| | $SO_4^{2-}$ | 197 |
| | $Cl^-$ | 177 |
| Water hardness (calculated as ppm of $CaCO_3$) | | 300 |

The pH is adjusted to 13 by addition of sodium hydroxide solution.

The experimental temperature is 60° C.

2. Experimental procedure

The inhibitors are added at a defined concentration (50 mg/l here) to the abovementioned water. The solutions are poured into glass bottles each having a volume of 1 liter. The bottles are then sealed and stored at the abovementioned temperature for 24 h.

After the end of the experiment the solution is filtered through a 0.45 µm membrane filter and then titrated with EDTA solution for determining the residual hardness. The residual hardness (%) is calculated via the following equation:

$$\text{Stabilized residual hardness } (\%) = 100 \cdot \frac{R_x - R_o}{R_a - R_o}$$

TABLE 1

| Concentrations of inhibitor and active compound | | | | Stabilized residual hardness |
|---|---|---|---|---|
| PAA | 50 mg/l | PC | 0 mg/l | 16.8% |
| PAA | 40 mg/l | PC | 10 mg/l | 55.9% |
| PAA | 30 mg/l | PC | 20 mg/l | 78.9% |
| PAA | 20 mg/l | PC | 30 mg/l | 77.0% |
| PAA | 10 mg/l | PC | 40 mg/l | 78.0% |
| PAA | 0 mg/l | PC | 50 mg/l | 74.6% |

PC: Polyacrylic acid, $\bar{M}_w = 2,000$;
Trade name Primal ® LMW-20x from Rohm & Haas.

EXAMPLE 2

Determination of the hardness stabilization

1. Parameter of the synthetic tap water used Concentration of the ions: see Example 1 pH adjusted to 11.00 by addition of sodium hydroxide solution Experimental temperature: 60° C.

2. Experimental procedure

The inhibitors are added at the concentration specified to the abovementioned water. The solutions are poured into glass bottles each having a volume of 1 liter. The bottles are then sealed and stored at the abovementioned temperature for 24 h.

After the end of the experiment and after the solutions have been cooled, the pHs of the waters are measured with a glass combination electrode.

The greater the decrease in pH from the initial value, the greater is the loss of carbonate ions and thus the smaller is the hardness-stabilizing action.

TABLE 2

| Concentrations of inhibitor and active compound | | | | pH at the end of the experiment |
|---|---|---|---|---|
| PAA | 20 mg/l | PC | 0 mg/l | 10.8 |
| PAA | 16 mg/l | PC | 4 mg/l | 10.9 |
| PAA | 12 mg/l | PC | 8 mg/l | 10.9 |
| PAA | 8 mg/l | PC | 12 mg/l | 10.9 |
| PAA | 4 mg/l | PC | 16 mg/l | 10.8 |
| PAA | 0 mg/l | PC | 20 mg/l | 10.5 |

PC: Polymaleic acid, trade name: Belclene ® 200

EXAMPLE 3

Inhibition of corrosion of carbon steel

1. For concentration of the ions in the water used, see Example 1, but double or triple concentration of the ions mentioned under 1.

2. Experimental procedure 4 pickled steel pipe rings of ST 35 (diameter 35 nun, length 40 mm, weight approximately 70 g) are attached in each case to a plastic stirrer and agitated at a velocity of 0.6 m/s at room temperature in an aquarium (24 cm high, 30 cm long, 22 cm wide) having a volume of 12 liters of water.

Pickling of the pipe rings:

1. Before the experiment a) the pipe rings are washed with dichloroethane and acetone, b) pickled for approximately 1 min in 10% strength HCl at 80° C., c) washed with tap water, demineralized water and 2×with acetone, d) dried in a warm air stream (hair-dryer) stored in a desiccator and weighed 2. After the experiment, a) the pipe rings are washed well with tap water, b) pickled for 30 s in 10% strength HCl at 80° C.

c) as 1. c)

d) as 1. d)

Corrosion rate:

1) in g/m²/d: (weight loss (g)−0.0037)×27.02

TABLE 3

| Experimental results in water with double the salt concentration of Example 1 | | | | | |
|---|---|---|---|---|---|
| Concentrations of inhibitor and active compound | | | | Corrosion rate (mm/a $\Delta$ g/m²/d) | |
| PAA | 40 mg/l | PC | 0 mg/l | 7.8 | 0.39 |
| PAA | 30 mg/l | PC | 10 mg/l | 3.4 | 0.17 |
| PAA | 20 mg/l | PC | 20 mg/l | 5.6 | 0.28 |
| PAA | 10 mg/l | PC | 30 mg/l | 4.2 | 0.21 |
| PAA | 0 mg/l | PC | 40 mg/l | 5.6 | 0.28 |

PC: Polyacrylic acid, $\bar{m}_w = 4,500$;
Trade name Primal ® LMW-45x from Rohm & Haas.

TABLE 4

Experimental results in water with three times the salt concentration of Example 1

| Concentrations of inhibitor and active compound | | | | Corrosion rate (mm/a $\Delta$ g/m$^2$/d) | |
|---|---|---|---|---|---|
| PAA | 40 mg/l | PC | 0 mg/l | 3.4 | 0.18 |
| PAA | 30 mg/l | PC | 10 mg/l | 1.4 | 0.07 |
| PAA | 20 mg/l | PC | 20 mg/l | 1.6 | 0.08 |
| PAA | 10 mg/l | PC | 30 mg/l | 1.9 | 0.10 |
| PAA | 0 mg/l | PC | 40 mg/l | 2.7 | 0.13 |

PC: Polyacrylic acid, $\bar{m}_2 = 4,500$
Trade name Primal ® LMW-45x from Rohm & Haas

We claim:

1. A composition for water treatment, and for use in alkaline cleansers, containing polyaspartic acid or a derivative thereof having a molecular weight of from 1,000 to 10,000 and a polycarboxylic acid having C—C chains, wherein said polycarboxylic acid is polyacrylic acid or a copolymer thereof or a polymaleic acid or a copolymer thereof and the ratio of said polyaspartic acid or a derivative thereof to said polycarboxylic acid in said composition is from 20:80 to 80:20.

2. A composition as claimed in claim 1, wherein the polyaspartic acid or derivative thereof and the polycarboxylic acid are present in the weight ratio of 20:80 to 60:40.

3. A composition as claimed in claim 1, wherein the polyaspartic acid derivative is a salt of polyaspartic acid or an anhydride of polyaspartic acid.

4. A composition as claimed in claim 1, wherein the polyaspartic acid is essentially a β-polyaspartic acid having a molecular weight of from 1,000 to 10,000.

5. A composition as claimed in claim 1, wherein the polycarboxylic acid is polyacrylic acid or a copolymer thereof having a molecular weight of from 500 to 4,500.

6. A composition as claimed in claim 5, wherein the polyaspartic acid or derivative thereof has a molecular weight of from 1,000 to 5,000.

7. A process for water treatment, wherein a composition as claimed in claim 1 is added to the water to be treated.

8. A process for alkaline cleaning, wherein a composition as claimed in claim 1 is added to water as an encrustation inhibitor/sequestrant.

9. A method of extracting mineral oil, wherein a composition as claimed in claim 1 is added to the injection water used in the extraction of the mineral oil.

* * * * *

UNITED STATES PATENT AND TRADEMARK OFFICE
CERTIFICATE OF CORRECTION

PATENT NO. : 5,525,257
DATED : June 11, 1996
INVENTOR(S) : Kleinstück, et al.

It is certified that error appears in the above-indentified patent and that said Letters Patent is hereby corrected as shown below:

On the title page:

In the Title section [54], "ACIDORA" should read --ACID OR A--. Also in the Title section [54], "POLCARBOXYLIC" should be --POLYCARBOXYLIC--.

In section [75] Inventors:, "Winfreid" should be --Winfried--.

In Column 1, the title section, "ACIDORA" should read --ACID OR A-- and "POLCARBOXYLIC" should be --POLYCARBOXYLIC--. Also in Column 1, line 55, "Phosphorares" should be --Phosphonates--; and in Column 1, line 64, "hypochloriteand" should be --hypochlorite and--.

In Column 2, line 20, "Art" should be --An--.

In Column 3, line 50, "iraconic" should be --itaconic--.

In Column 4, line 34, "about i and 50 mg/l" should read --about 1 and 50 mg/l--.

In Column 5, between lines 37-40, the formula should read $$\text{--Stabilized residual hardness}(\%) = 100 \cdot \frac{R_x - R_o}{R_t - R_o} \text{--.}$$

UNITED STATES PATENT AND TRADEMARK OFFICE
CERTIFICATE OF CORRECTION

PATENT NO. : 5,525,257
DATED : June 11, 1996
INVENTOR(S) : Kleinstück, et al.

It is certified that error appears in the above-indentified patent and that said Letters Patent is hereby corrected as shown below:

In Column 5, between lines 40-42, before "TABLE 1", the following should be inserted:

-- $R_x$ = residual hardness of sample X
$R_a$ = initial hardness
$R_o$ = residual hardness of the blank sample --.

In Column 5, lines 57-59,

"1. Parameter of the synthetic tap water used Concentration of the ions: see Example 1 pH adjusted to 11.00 by"

should read

--1. Parameter of the synthetic tap water used
Concentration of the ions: see Example 1
pH adjusted to 11.00 by--.

In Column 6, line 29, "nun," should be --mm,--.

Signed and Sealed this

Third Day of December, 1996

Attest:

BRUCE LEHMAN

*Attesting Officer*          *Commissioner of Patents and Trademarks*